(12) United States Patent
Pirzada

(10) Patent No.: US 7,929,672 B2
(45) Date of Patent: Apr. 19, 2011

(54) CONSTRAINED AUTOMATIC SPEECH RECOGNITION FOR MORE RELIABLE SPEECH-TO-TEXT CONVERSION

(75) Inventor: Shamim Sharifuddin Pirzada, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1118 days.

(21) Appl. No.: 11/406,713

(22) Filed: Apr. 18, 2006

(65) Prior Publication Data
US 2007/0266100 A1    Nov. 15, 2007

(51) Int. Cl.
*H04M 1/64* (2006.01)
*G10L 15/00* (2006.01)

(52) U.S. Cl. ..................... 379/88.22; 704/231

(58) Field of Classification Search .............. 379/265.02–266.01, 88.02–88.06, 379/88.14–88.15, 88.18; 704/231; 705/35
See application file for complete search history.

(56) References Cited

U.S. PATENT DOCUMENTS

| | | | | |
|---|---|---|---|---|
| 5,970,122 | A * | 10/1999 | LaPorta et al. | 340/7.23 |
| 6,014,429 | A * | 1/2000 | LaPorta et al. | 379/88.15 |
| 6,366,651 | B1 * | 4/2002 | Griffith et al. | 379/88.14 |
| 6,587,558 | B2 * | 7/2003 | Lo | 379/265.09 |
| 7,624,010 | B1 * | 11/2009 | Kroeker et al. | 704/235 |
| 2003/0039340 | A1 * | 2/2003 | Deshpande et al. | 379/88.16 |
| 2003/0179876 | A1 * | 9/2003 | Fox et al. | 379/265.02 |
| 2005/0001720 | A1 * | 1/2005 | Mason et al. | 340/539.13 |
| 2010/0100378 | A1 * | 4/2010 | Kroeker et al. | 704/235 |
| 2010/0169352 | A1 * | 7/2010 | Flowers et al. | 707/759 |

* cited by examiner

*Primary Examiner* — Fan Tsang
*Assistant Examiner* — Mohammad Islam
(74) *Attorney, Agent, or Firm* — Stolowitz Ford Cowger LLP

(57) ABSTRACT

A device and method are provided which preferably establish cross-modal communications and allow telephony users and text-based users, such as Instant Messaging (IM) users, to communicate with each other. The device may include a processor that receives a text message preferably comprising a query, a keyword, and one or more responses to the query. The processor preferably generates a vocabulary containing the one or more responses provided in the text message. The method preferably includes receiving a text message comprising a query, a keyword, and one or more responses to the query. The method may further include converting the text message into an audible message, sending the audible message to a telephony user, receiving an audible response from the telephony user, and generating text from the audible response. The method may further include generating a vocabulary comprising the one or more responses provided in the text message.

41 Claims, 3 Drawing Sheets

CONSTRAINED AUTOMATIC SPEECH RECOGNITION FOR MORE RELIABLE SPEECH-TO-TEXT CONVERSION

TECHNICAL FIELD

The invention relates generally to speech recognition and, in particular, to an apparatus and method for increasing reliability of speech-to-text conversion.

BACKGROUND OF THE INVENTION

Instant messaging (IM) allows people to send text messages to others while being on a computer or a hand-held device connected to a network. With IM, messages are delivered without the recipient having to access an e-mail program or otherwise check for messages. Messages are delivered instantly and appear essentially as soon as the message sender clicks the send button. Compared to most e-mail applications, instant messaging enables users to communicate with each other in a more dynamic and interactive manner.

Although many devices today can handle different forms of communications, there is a need for "cross-modal communications" to accommodate modality differences between the communication originator and recipient. That is, because of differences in individual user preferences, dynamic user situations, and device limitations, the communication originator may be using one mode of communications such as IM and the recipient may be using another mode of communications such as voice.

With text-to-speech (TTS) technology, "cross-modal" communications facilitates delivery of text messages via speech. However, speech-to-text or Automatic Speech Recognition (ASR) technology remains a technical challenge. Although ASR technology has evolved continuously over the past several decades, error rates remain fundamentally dependent on performance factors such as degree of speaker independence and the size of the vocabulary of words to be recognized. Errors may also be introduced by the equipment and processes involved in capturing, processing, and transmitting speech.

Single-speaker-dependent systems can greatly reduce errors in ASR systems. However, such systems usually entail additional hardware and software requirements and also include training time for phonetic recognition and for establishing personal vocabularies and word use patterns.

Traditional speech recognition applications such as directory services have implemented ASR systems using limited, pre-defined vocabularies to automate information retrieval. These speaker independent systems attempt to perform speech recognition for any caller over a telephony connection. However, these ASR systems do not generally perform well due to the large variations between speech patterns. Errors introduced by telephony equipment and networks also contribute to the poor performance of these systems.

Converting speech to text remains very difficult to accomplish, particularly within a handheld or portable device. Conversion of speech having very large vocabularies remains a technical challenge for even the most advanced and powerful speech recognition systems. Thus, there is a need for an improved speech-to-text recognition system to provide a more robust "cross-modal" communications.

SUMMARY OF THE INVENTION

An apparatus and method preferably provide a means for a text-based user to receive messages from a telephony user that have been converted to text messages and the text-based user to respond to the telephony user using text messages.

One aspect of the invention is a network device that preferably includes a processor that receives a text message comprising a query, a keyword, and specified responses to the query. The network device may further include a speech synthesizer to convert the text message into an audible message and a speech recognizer to receive an audible response and generate text from the audible response.

Another aspect of the invention is a method that preferably includes receiving a text message comprising a query, a keyword, and specified responses to the query. The method preferably further includes converting the text message into an audible message and audibly sending the audible message to a telephony user. The method may further include receiving an audible response from the telephony user and generating text from the audible response.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles of the invention to those skilled in the art.

The embodiments of the invention establish cross-modal communications and allow telephony users and text-based users, such as Instant Messaging (IM) users, to communicate with each other. For instance, the IM user may send and receive text messages, and the telephony user may send and receive audible messages.

Figure 1:
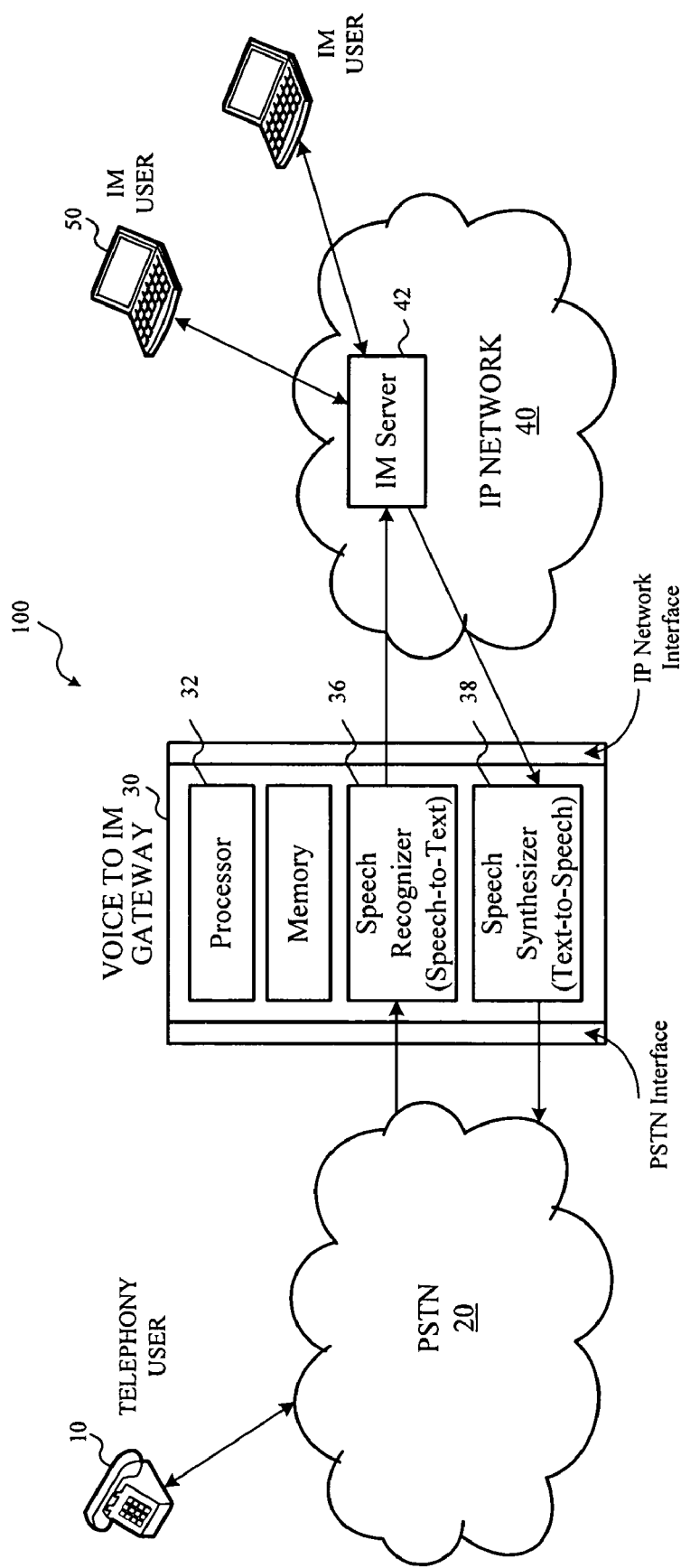
FIG. 1 shows a block diagram of a communications network wherein a text-based user receives messages from a telephony user that have been converted to text messages and the text-based user responds to the telephony user using text messages.

FIG. 1 shows a block diagram of a communications network 100 wherein a text-based user, such as an Instant Messaging (IM) user 50, receives messages from a telephony user 10 that have been converted to text messages and the text-based user 50 responds to the telephony user 10 using text messages. The communications network may include a circuit-switched telephone network such as the public switched telephone network (PSTN) 20, a network device such as the voice-to-IM gateway device 30, and a packet-switched network such as the Internet Protocol (IP) network 40. In the IP network 40, an IM server 42 may provide IM services between IM users.

The voice-to-IM gateway device 30 preferably receives audio signals from the telephony user 10 and translates the audio signals into text messages for the IM user 50. The voice-to-IM gateway device 30 preferably further translates text messages received from the IM user 50 into audio signals for the telephony user 10. The voice-to-IM gateway device 30 may include a processor 32 that receives the text message from the IM user 50, a speech synthesizer 38 that converts the text message into an audible message for the telephony user 10, and a speech recognizer 36 that receives an audible response from the telephony user 10. The speech recognizer 36 preferably generates text from the audible response and sends the text to the IM user 50. In other embodiments, components of the voice-to-IM gateway device 30 need not be embodied in a single device and one or more of the components may be implemented in other devices, including a telephone.

Figure 2:
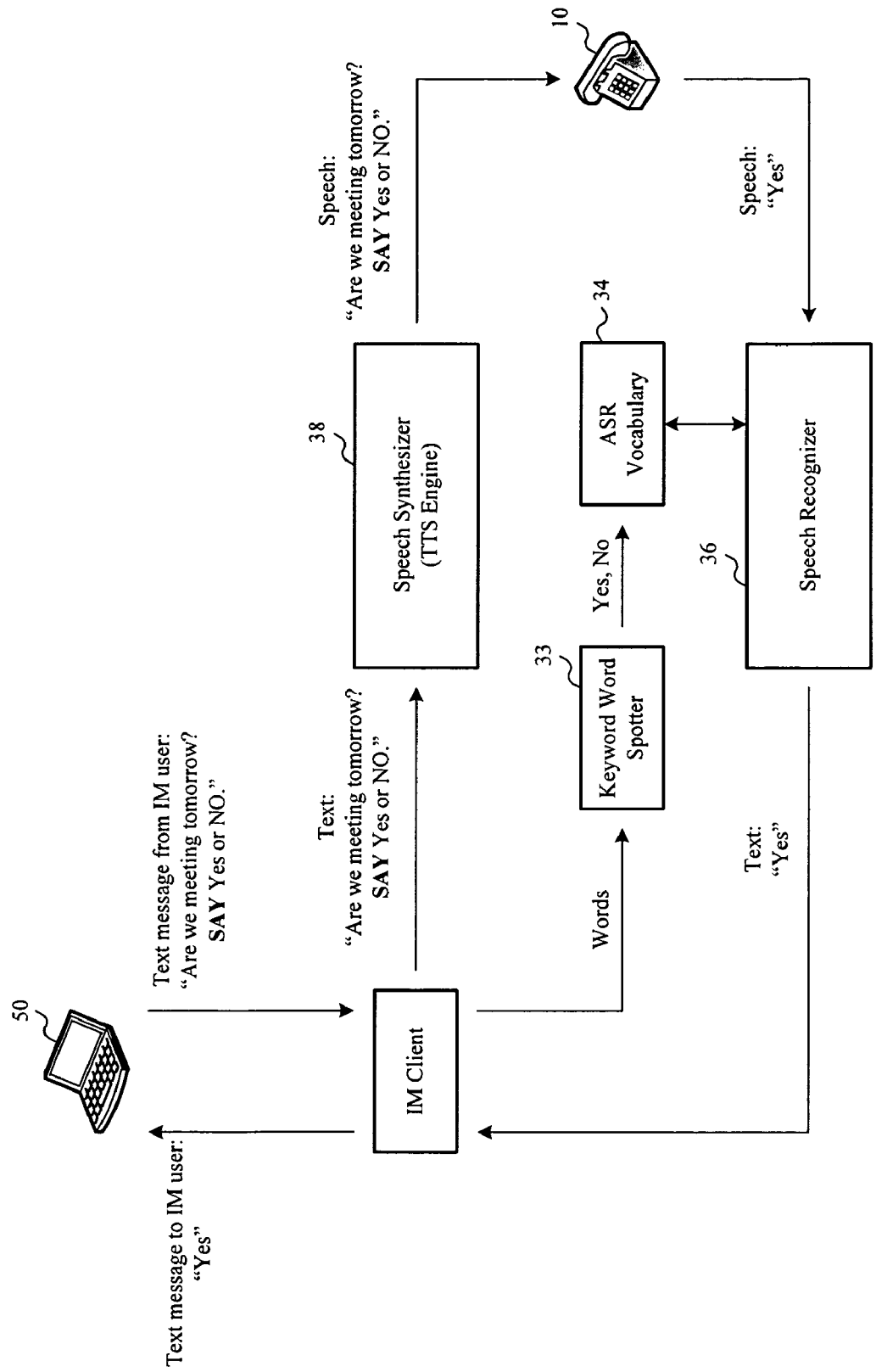
FIG. 2 illustrates an example of cross-modal communication between an IM user and a telephony user.

FIG. 2 illustrates an example of cross-modal communication between the IM user 50 and the telephony user 10. In one embodiment, the text message from the IM user 50 preferably includes a query, a keyword, and one or more responses to the query. A keyword spotter 33 in the voice-to-IM gateway device 30 (FIG. 1) preferably recognizes the keyword provided in the received text message. The voice-to-IM gateway device 30 may then generate a vocabulary 34 that preferably contains the one or more responses provided in the text message from the IM user 50. In one embodiment, the voice-to-IM gateway device 30 preferably generates the vocabulary 34 that includes words that occur after the recognized keyword and ignores words that occur before the recognized keyword. The speech recognizer 36 then preferably compares the audible response with the one or more responses in the vocabulary 34 and generates the text corresponding to the audible response when the comparison yields a match among the one or more responses in the vocabulary 34. In one embodiment, the contents of the vocabulary 34 may change according to the one or more responses provided in the received text message.

By using predefined keywords and generating a vocabulary 34 that contains the possible responses, the speech recognition system 36 implemented in the gateway device 30 increases in accuracy. As shown in FIG. 2, the IM user 50 preferably uses a question and answer format with a keyword to indicate the choices. To define the answers, the keyword may be inserted before the possible answers. For example, the text message from the IM user may be "Are we meeting tomorrow? Say YES or NO." The keyword is "say" followed by the specified responses "yes" and "no" expected from the telephony user 10. The keyword, "say" in this example, is preferably used to limit the speech recognition vocabulary 34 used to process the telephony user's response. Limiting the vocabulary for responses increases the effectiveness of the speech recognition system.

Figure 3:
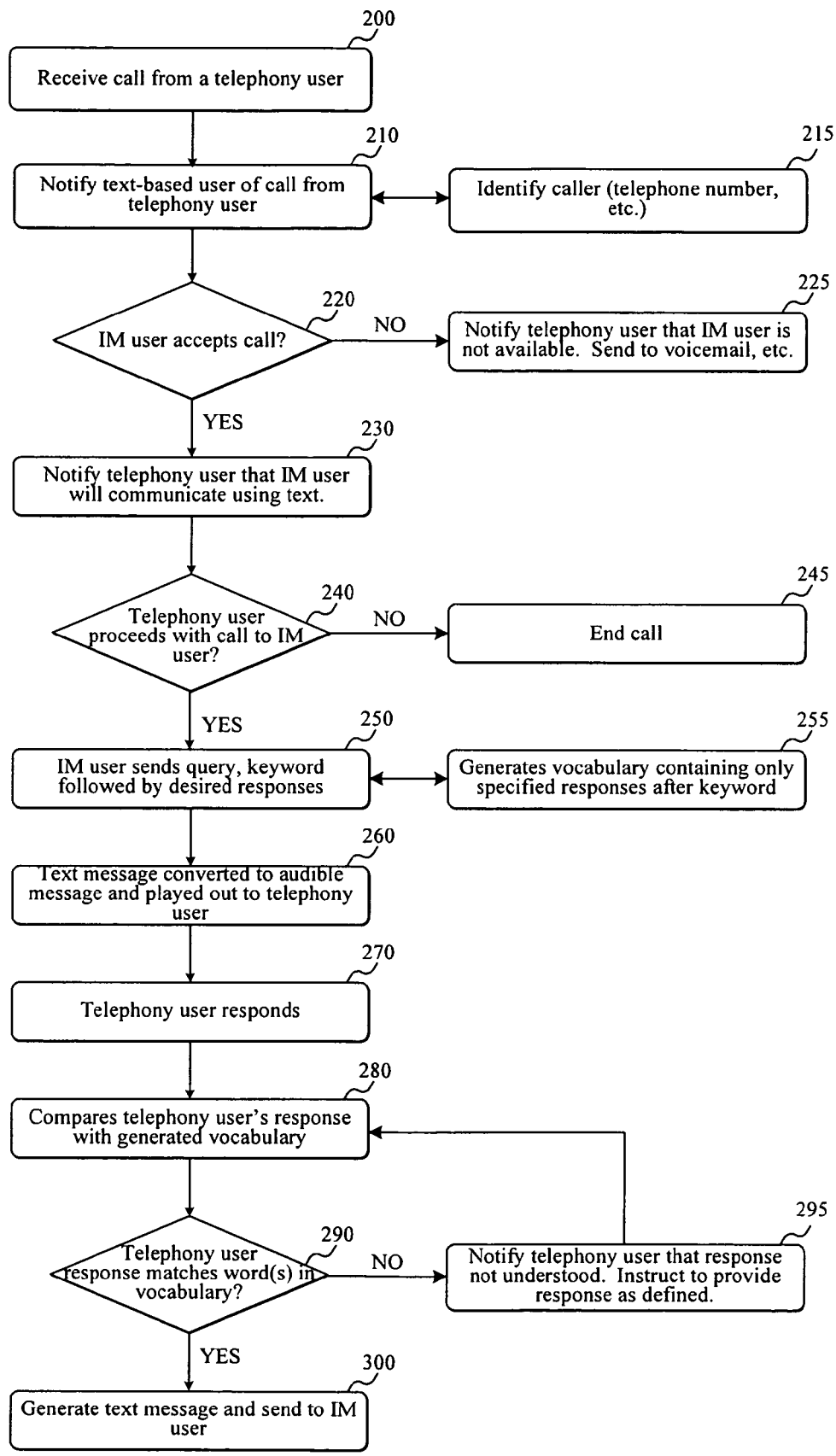
FIG. 3 is a flowchart illustrating an operation of one embodiment of the invention.

FIG. 3 is a flowchart illustrating an operation of one embodiment of the invention. Referring to FIGS. 1-3, in block 200, a telephony user 10 may initiate a voice call. In one embodiment, the called party may not be available by telephone but may be connected to the IP network 40 as an IM user 50. In block 210, the voice-to-IM gateway device 30 notifies the IM user 50 of the call or request for connection from the telephony user 10. In block 215, the voice-to-IM gateway device 30 preferably identifies the caller, for example, by identifying the telephone number of the caller.

In block 220, the voice-to-IM gateway device 30 then preferably processes the request for connection according to instructions from the IM user 50. For example, the IM user 50 may choose not accept to call from the telephony user 10. Thus, in block 225, the voice-to-IM gateway device 30 preferably notifies the telephony user that the called party is not available and the voice-to-IM gateway device 30 may then take action as instructed by the IM user 50, such as transfer the telephony user 10 to a voicemail account of the called party. Otherwise, in block 230, the voice-to-IM gateway device 30 may notify the telephony user 10 that the called party is available via instant messaging and will communicate using text messaging.

In block 240, the voice-to-IM gateway device 30 may provide the telephony user 10 an option to continue with the call to the IM user 50. In block 245, the telephony user 10 may opt not to proceed with the call and the call ends. However, in block 250, if the telephony user 10 chooses to proceed with the call, the IM user 50 then preferably sends a text message including a query, a keyword, and one or more responses following the keyword.

In block 255, a vocabulary 34 may then be generated that preferably contains only the responses specified in the text message. In block 260, the text message may then be converted to an audible message that is then played out to the telephony user 10. In block 270, the telephony user 10 preferably responds. In block 280, the voice-to-IM gateway device 30 then preferably compares the response provided by the telephony user 10 to the responses contained in the generated vocabulary 34. If, in block 290, no match is found between the response from the telephony user 10 and the responses contained in the generated vocabulary 34, in block 295, the voice-to-IM gateway device 30 preferably notifies the telephony user 10 that the response was not understood. The telephony user 10 then may be provided with additional instructions including, for example, to repeat the specified response. If a match is found, in block 300, the voice-to-IM gateway device 30 preferably generates text corresponding to the audible response from the telephony user 10 and sends the text to the IM user 50.

The embodiment discussed in FIG. 3 provides for the situation where a telephony user 10 initiates a call with the IM user 50. Those skilled in the art will recognize that the call may also be initiated by the IM user 50 with only minor modifications of the above procedure and without departing from the principles of the invention.

The system described above can use dedicated processor systems, microcontrollers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software. They may also be modified in structure, content, or organization without departing from the spirit and scope of the invention.

It should be appreciated that reference throughout this specification to "one embodiment" or "an embodiment" means that a particular feature, structure, or characteristic described in connection with the embodiment may be included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined or separated as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, having described exemplary embodiments of the invention, it is noted that modifications and variations can be made by persons of ordinary skill in the art in light of the above teachings. Therefore, it is to be understood that changes may be made to embodiments of the invention disclosed that are nevertheless still within the scope of the claims.

The invention claimed is:

1. A network device, comprising:
 a processor to receive a text message from a text-enabled endpoint device over a first network, wherein the text message includes a query initiated by the text-enabled endpoint device and one or more acceptable responses to the query;
 a speech synthesizer to convert the text message into an audible message for transmission over a second network to a telephone endpoint device, wherein the processor is configured to compare an audible response received from the telephony endpoint device to the one or more acceptable responses included in the text message received from the text-enabled endpoint device; and
 a speech recognizer to generate a response text message corresponding to the audible response when the audible response matches at least one of the one or more acceptable responses, wherein the response text message is to be sent to the text-enabled endpoint over the first network.

2. The network device of claim 1, wherein the processor is further adapted to generate a vocabulary comprising the one or more responses provided in the text message.

3. The network device of claim 2, wherein the speech recognizer is further adapted to compare the audible response with the one or more responses in the vocabulary.

4. The network device of claim 3, wherein the speech recognizer is further adapted to generate the text from the audible response when the comparison yields a match among the one or more responses in the vocabulary.

5. The network device of claim 2, wherein contents of the vocabulary change according to the one or more responses provided in the received text message.

6. The network device of claim 1, further comprising:
 a keyword spotter adapted to recognize a keyword provided in the received text message.

7. The network device of claim 6, wherein the processor is further adapted to generate a vocabulary comprising words occurring after the recognized keyword.

8. The network device of claim 7, wherein the processor is further adapted to generate a vocabulary ignoring words occurring before the recognized keyword.

9. The network device of claim 1, further comprising:
 an interface adapted to receive a request for connection from a telephony user.

10. The network device of claim 9, wherein the processor is adapted to notify a text-based user that the request for connection was received.

11. The network device of claim 10, wherein the processor is further adapted to process the request for connection according to instructions from the text-based user.

12. The network device of claim 1, wherein the text message is received from an instant messaging (IM) user.

13. A method, comprising:
 converting a text message received from a text-enabled endpoint device over a first network into an audible message, wherein the text message includes a query initiated by the text-enabled endpoint device and one or more allowable responses to the query in the text message;
 sending the audible message to a telephony endpoint device over a second network;
 receiving an audible response from the telephony endpoint device over the second network;
 comparing the audible response from the telephony endpoint device to the one or more allowable responses included in the text message received from the text-enabled endpoint device over the first network; and
 when the audible response matches at least one of the one or more allowable responses, transmitting a response text message corresponding to the audible response to the text-enabled endpoint device over the first network.

14. The method of claim 13, further comprising:
 generating a vocabulary comprising the one or more responses provided in the received text message.

15. The method of claim 14, further comprising:
 comparing the audible response from the telephony user to the one or more responses in the generated vocabulary.

16. The method of claim 15, further comprising:
 generating text corresponding to the audible response when the comparison yields a match among the one or more responses in the generated vocabulary.

17. The method of claim 13, further comprising:
 recognizing a keyword provided in the received text message.

18. The method of claim 17, further comprising:
 generating a vocabulary comprising words occurring after the recognized keyword.

19. The method of claim 17, further comprising:
 generating a vocabulary ignoring words occurring before the recognized keyword.

20. The method of claim 13, further comprising:
 receiving from the telephony user a request for connection with a text-based user; and
 notifying the text-based user of the request for connection received from the telephony user.

21. The method of claim 20, further comprising:
 transferring the telephony user to a voicemail account of the text-based user when the text-based user declines the request for connection.

22. The method of claim 20, further comprising:
 notifying the telephony user that the text-based user will communicate with the telephony user using text messaging.

23. A network device, comprising:
 means for converting a text message received from a text-enabled endpoint device over a first network into an audible message, wherein the text message includes a query initiated by the text-enabled endpoint device and one or more allowable responses to the query in the text message;

means for sending the audible message to a telephony endpoint device over a second network;
means for receiving an audible response from the telephony endpoint device over the second network;
means for comparing the audible response from the telephony endpoint device to the one or more allowable responses included in the text message received from the text-enabled endpoint device over the first network; and
means for transmitting a response text message corresponding to the audible response to the text-enabled endpoint device over the first network when the audible response matches at least one of the one or more allowable responses.

24. The network device of claim 23, further comprising:
means for generating a vocabulary comprising the one or more responses provided in the received text message.

25. The network device of claim 23, further comprising:
means for comparing the audible response from the telephony user to the one or more responses in the generated vocabulary.

26. The network device of claim 23, further comprising:
means for recognizing a keyword provided in the text message.

27. The network device of claim 26, further comprising:
means for generating a vocabulary comprising words occurring after the recognized keyword.

28. The network device of claim 26, further comprising:
means for generating a vocabulary ignoring words occurring before the recognized keyword.

29. The network device of claim 23, further comprising:
means for receiving from the telephony user a request for connection with a text-based user; and
means for notifying the text-based user of the request for connection received from the telephony user.

30. The network device of claim 29, further comprising:
means for transferring the telephony user to a voicemail account of the text-based user.

31. The network device of claim 29, further comprising:
means for notifying the telephony user that the text-based user will communicate with the telephony user using text messaging.

32. An article of non-transitory computer-readable medium containing instructions that, when executed, cause a computer to:
convert a text message received from a text-enabled endpoint device over a first network into an audible message, wherein the text message includes a query initiated by the text-enabled endpoint device and one or more allowable responses to the query in the text message;
send the audible message to a telephony endpoint device over a second network;
receive an audible response from the telephony endpoint device over the second network;
comparing the audible response from the telephony endpoint device to the one or more allowable responses included in the text message received from the text-enabled endpoint device over the first network; and
when the audible response matches at least one of the one or more allowable responses, transmitting a response text message corresponding to the audible response to the text-enabled endpoint device over the first network.

33. The article of claim 32, further comprising instructions that, when executed, cause the computer to generate a vocabulary comprising the one or more responses provided in the text message.

34. The article of claim 33, wherein the instructions that, when executed, cause the computer to compare the audible response with the one or more responses in the vocabulary.

35. The article of claim 34, wherein the instructions that, when executed, cause the computer to generate the text corresponding to the audible response when the comparison yields a match among the one or more responses in the vocabulary.

36. The article of claim 32, wherein the instructions that, when executed, further cause the computer to recognize a keyword provided in the received text message.

37. The article of claim 36, further comprising instructions that, when executed, cause the computer to generate a vocabulary comprising words occurring after the recognized keyword.

38. The article of claim 36, further comprising instructions that, when executed, cause the computer to generate a vocabulary ignoring words occurring before the recognized keyword.

39. The article of claim 32, further comprising instructions that, when executed, cause the computer to receive a request for connection from a telephony user.

40. The article of claim 39, further comprising instructions that, when executed, cause the computer to notify a text-based user that the request for connection was received.

41. The article of claim 40, further comprising instructions that, when executed, cause the computer to process the request for connection according to instructions from the text-based user.

* * * * *